Patented Oct. 4, 1932

1,880,315

UNITED STATES PATENT OFFICE

FRITZ CROTOGINO, OF NEUSTASSFURT, NEAR STASSFURT, GERMANY, ASSIGNOR TO THE FIRM KALI-CHEMIE AKTIENGESELLSCHAFT, OF BERLIN, GERMANY, A JOINT-STOCK COMPANY OF GERMANY

PRODUCTION OF FRITTED MAGNESIA CONTAINING IRON

No Drawing. Application filed August 11, 1930, Serial No. 474,666, and in Germany August 12, 1929.

For the lining of retorts for the production of iron it has been found best to employ a ferriferous magnesia such as can be obtained from some naturally occurring magnesites by calcining. Attempts to obtain a similar product from magnesite that is free from iron by melting it down with iron compounds, have failed.

Fritted magnesia containing iron was hitherto only obtained artificially by sintering magnesia precipitated in the form of sludge by means of suitable chemicals from aqueous solutions of magnesium salts, with iron compounds. With this process, therefore, solutions of magnesium salts or soluble magnesium salts were employed as the initial material.

The surprising observation has now been made that the magnesia directly produced from calcined dolomite by leaching out the calcium oxide, if sintered together with iron or with iron oxides, iron ores or salts of iron, yields a fritted magnesia of a quality which is as good as that obtained from natural ferriferous magnesite by calcining.

This advantageous technical result may perhaps be explained by the fact that the surface of the magnesia is so loosened after the calcium oxide is leached out that it enters into a far more intimate union with the ferriferous substances than the magnesia which has been obtained from magnesite by calcining.

The leaching of the calcium oxide out of the calcined dolomite can be effected in various ways. The most rational method is to heat the calcined dolomite with the sal-ammoniac resulting from the Solvay ammonia soda process, whereupon the quicklime undergoes double decomposition with the ammonium chloride with the formation of calcium chloride and the liberation of ammonia gas. Only so much sal-ammoniac lye should be employed that the lime present is fully sufficient to decompose the sal-ammoniac.

In order to ensure a uniform distribution of the ferric oxide, which forms from the metallic iron during the fritting even when iron dust is employed, it is advisable to add the iron or the iron compound to the suspension of the magnesium oxide even before the separation of the calcium chloride is effected. It is particularly advantageous to add the iron compounds, siderite for instance along with the sal-ammoniac lye, whereby a particularly fine distribution is obtained.

For example 100 parts of a dolomite containing 1½ parts of aluminium silicate besides 55 parts of calcium carbonate and 42 parts of magnesium carbonate are calcined, and then heated with an ammonium chloride solution containing 55 parts of ammonium chloride and with 2.2 parts of siderite. The ammonia gas is collected, the aqueous solution containing calcium chloride is removed by pressure, and the residue is fritted with the addition of two parts of ferric oxide.

What I claim is:—

1. A process for the production of fritted magnesia containing iron, comprising heating calcined dolomite with sufficient ammonium chloride solution to convert almost the whole of its calcium oxide into calcium chloride, adding iron compounds that are insoluble in water, separating the undissolved magnesium oxide from the solution containing the calcium chloride, and sintering the magnesium oxide thus separated with iron.

2. A process for the production of fritted magnesia containing iron, comprising heating calcined dolomite with an insoluble iron compound and with sufficient ammonium chloride solution to convert almost the whole of its calcium oxide into calcium chloride, then separating the undissolved magnesium oxide, which is uniformly mixed with the insoluble iron compound, from the solution containing the calcium chloride, and sintering.

In testimony whereof I have signed my name to this specification.

FRITZ CROTOGINO.